Sept. 30, 1947.  W. UEBELHOER  2,428,131
MATERIAL MOVING APPARATUS
Filed Dec. 28, 1945  4 Sheets-Sheet 1
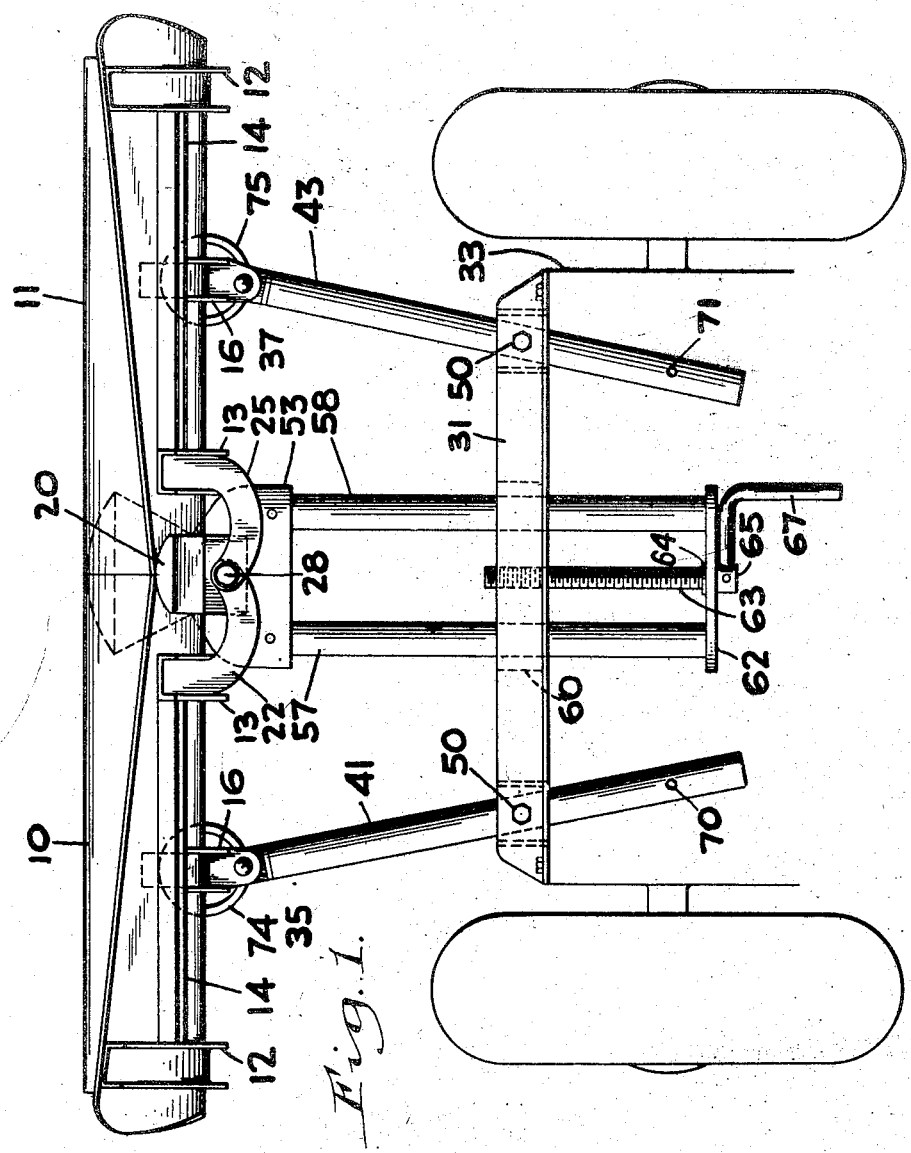
INVENTOR
Walter Uebelhoer
BY
Bean, Brooks, Buckley & Bean.
ATTORNEYS

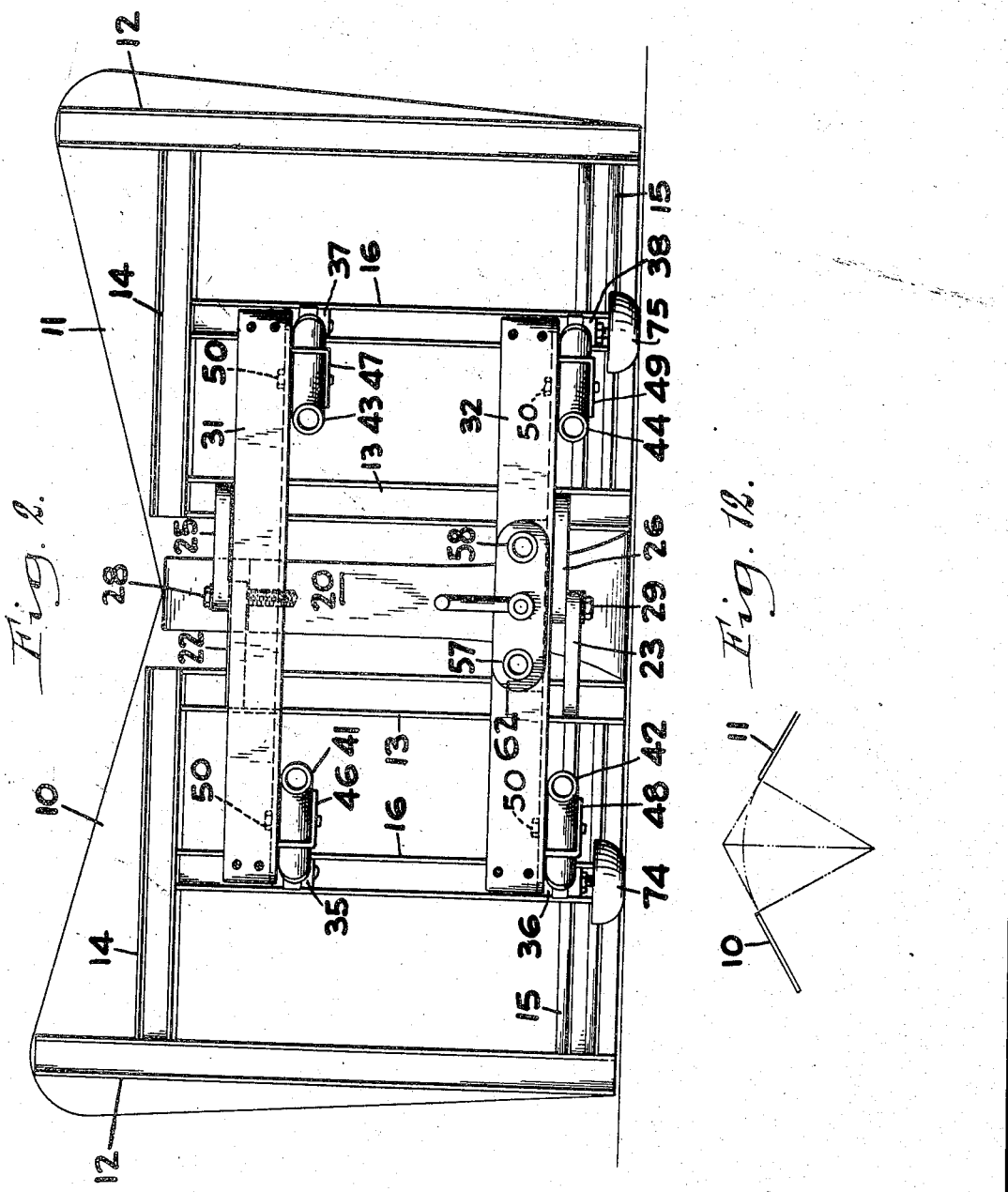

Sept. 30, 1947.  W. UEBELHOER  2,428,131
MATERIAL MOVING APPARATUS
Filed Dec. 28, 1945  4 Sheets-Sheet 3
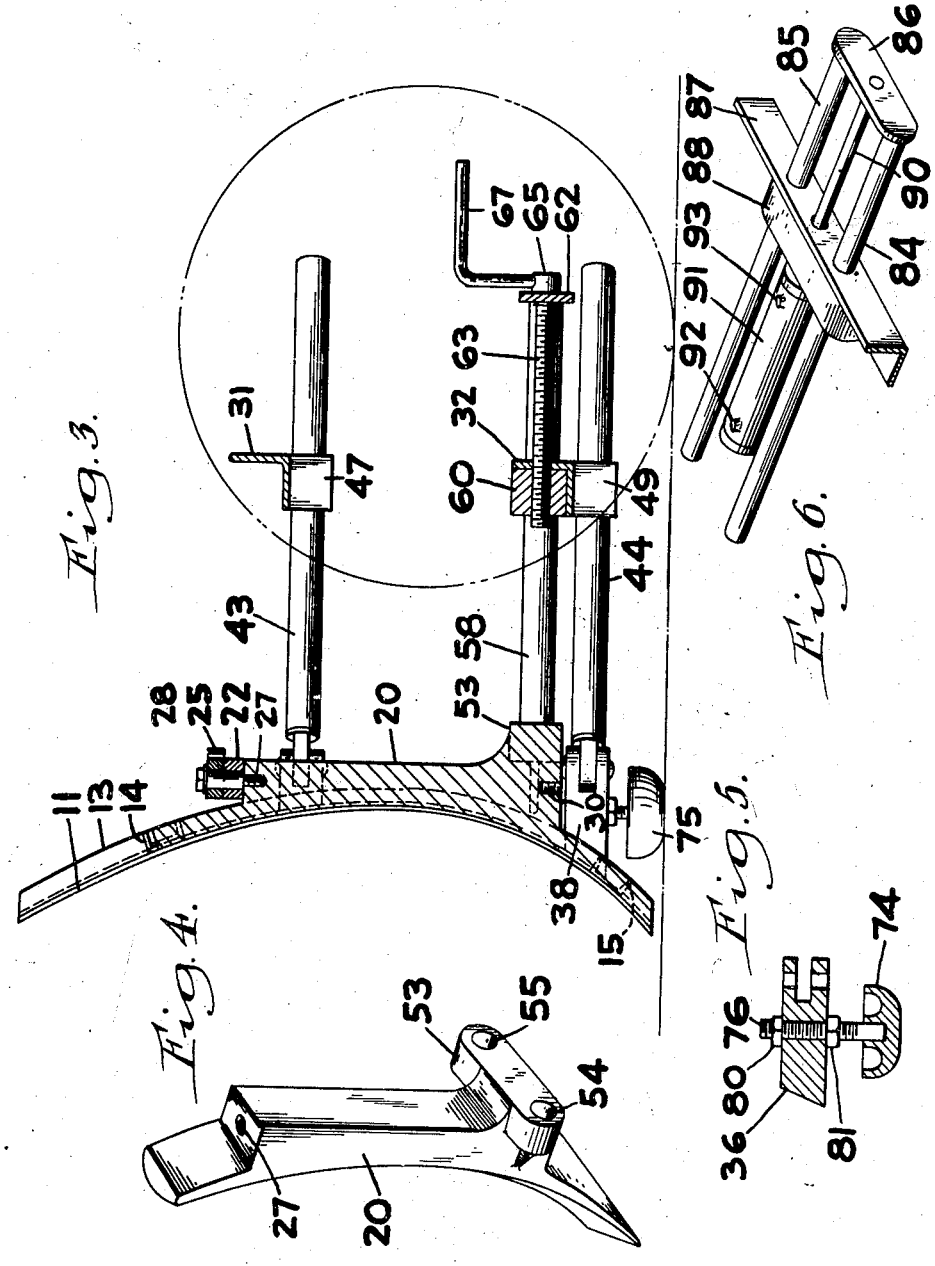
INVENTOR
Walter Uebelhoer
BY
Beau, Brooks, Buckley & Beau
ATTORNEYS

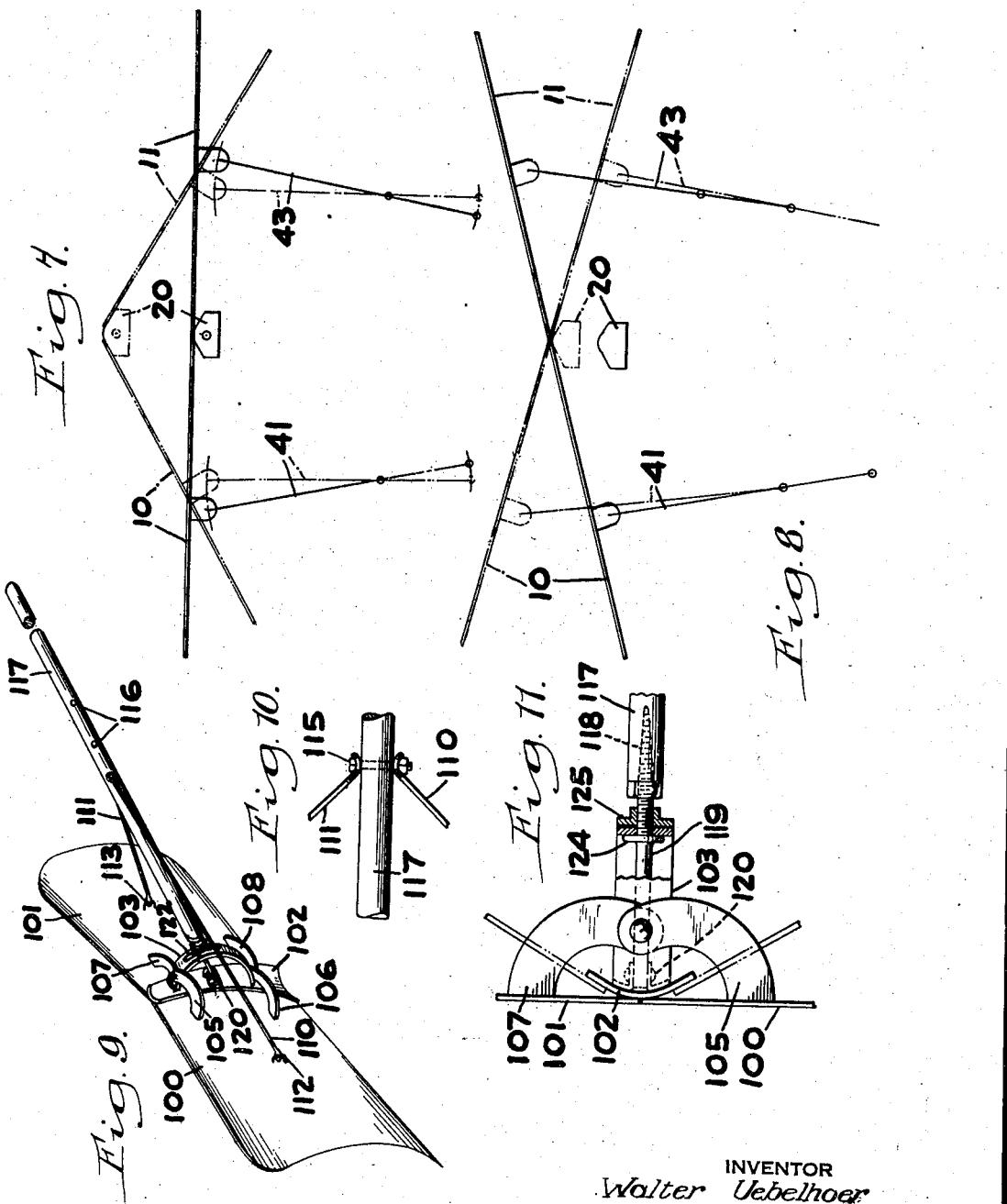

Patented Sept. 30, 1947

2,428,131

UNITED STATES PATENT OFFICE 2,428,131

MATERIAL MOVING APPARATUS

Walter Uebelhoer, Snyder, N. Y.

Application December 28, 1945, Serial No. 637,532

13 Claims. (Cl. 37—42)

This invention relates to plowing and scraping apparatus for moving snow, earth, and analogous relatively loose materials.

The present invention provides apparatus which may readily be associated with any form of vehicle desired to propel the plowing and scraping device. In the alternative, the principles of the invention may be embodied in a modified form of apparatus suitable for hand operation. In the power-operated form the vehicle with which the apparatus may be associated may take the form of a tractor or other farm vehicle, a commercial truck, a passenger automobile, or any other automotive vehicle.

According to the present invention, the apparatus is structurally so arranged that the thrust forces are advantageously distributed both with respect to the surfaces of the plowing or scraping blades themselves and with respect to the means connecting the apparatus with the propelling vehicle. Further, the structural arrangement is such that a very simple and rugged plowing or scraping means is afforded.

The plowing or scraping device is so arranged that the effective plowing angles may be readily varied without in any sense affecting the inherent rigidity and potential strength of the structure. A wide range of adjustment is afforded whereby a highly flexible plowing and scraping apparatus is provided. The plowing or scraping surface comprises two main blade components which may be adjusted to provide a V-shaped leading edge of any angle within certain limits, the limit of such angles in one direction being a straight transverse line. Further, the two main blade components may be arranged in line with both components facing either to the left or to the right, whereby all of the plowed or scraped material is deflected in one direction, either to the left or to the right as desired.

A significant feature of the plowing or scraping apparatus is the provision of a central mounting device which includes a novel central nose or prow portion which bridges the gap which would otherwise occur centrally between the two main blade components in certain positions of adjustment. This bridging of the gap by the central member is accomplished in such manner that in all positions of adjustment the blade components together with the central member present a substantially continuous plowing or scraping surface.

While devices of the general kind forming the subject of the present invention operate most efficaciously when used with some form of power propulsion means, the fundamental teachings of the present invention, as outlined generally above, may be availed of in a manual plowing and scraping device. In any event, the principles of the present invention are not limited to the forms shown by way of example and many mechanical departures may be made within the spirit and scope of the invention, which is limited only as defined in the appended claims.

In the drawings:

Fig. 1 is a top plan view of one form of the apparatus of our invention with a propelling vehicle therefor shown fragmentarily;

Fig. 2 is a rear elevational view of the apparatus of Fig. 1 shown detached from the propelling vehicle;

Fig. 3 is a central longitudinal cross-sectional view on a vertical plane of the apparatus of Figs. 1 and 2;

Fig. 4 is a detailed perspective view of the central nose or prow element of the apparatus of Figs. 1 through 3;

Fig. 5 is a detailed longitudinal vertical cross-sectional view through one of a pair of supporting skids;

Fig. 6 is a fragmentary perspective view of alternative fluid power means for effecting adjustment of the blade elements of the device;

Fig. 7 is a diagrammatic view showing the range of adjustment of the blades from their most acute V position to a straight-across arrangement;

Fig. 8 is a diagrammatic view showing the blades arranged in line but obliquely, for deflecting plowed or scraped material either all to the right or all to the left;

Fig. 9 is a perspective view of a hand plowing or scraping device embodying the principles of the present invention;

Fig. 10 is a fragmentary plan view of a portion of the device of Fig. 9;

Fig. 11 is a further fragmentary plan view of the device of Fig. 9 with portions broken away for added clearness; and Fig. 12 is a diagrammatic view showing the effective relationship of the two blade elements and the central nose portion when the blades are arranged in their most acute position of adjustment.

Throughout the several figures of the drawings like characters of reference denote like parts and the numerals 10 and 11 designate a pair of left and right hand plow or scraping blade elements. As appears best in Fig. 2, each of the blades 10 and 11 is reinforced at its rear face by outer upright channels 12, inner upright channels 13, upper horizontally extending channels 14, lower horizontally extending channels 15 and upright central channels 16.

A special central upright nose or prow element is designated 20 and is shown in perspective viewed generally from the rear in Fig. 4. The left-hand blade 10 has fixed thereto upper and lower pivot arms 22 and 23 which may be welded or otherwise fixed in the inner upright reinforcing channel 13. The right-hand blade 11 likewise has upper and lower pivot arms 25 and 26, similarly secured, and the prow element 20 has an upper threaded opening 27 and a similar coaxial lower threaded opening 30 (not shown) for receiving pivot screws 28 and 29 which pass jointly through the upper and lower pivot arms of the blades 10 and 11 as best shown in Fig. 2.

The specific means for securing the plowing or scraping apparatus to a propelling vehicle will vary somewhat with variations in the construction of the propelling vehicle. By way of example, the apparatus of Figs. 1, 2, and 3 includes upper and lower transverse bars 31 and 32 which may be of angular cross-section, as shown, and secured to the front structure of the vehicle in any desired manner, as by bolting or screwing. Fig. 1 shows fragmentarily the front frame portion of a propelling vehicle at 33.

The left-hand blade 10 is provided with upper and lower bearing yokes 35 and 36 which may be welded or otherwise secured in the central upright channel 16. Similar upper and lower bearing yokes 37 and 38, respectively, are associated with the right-hand blade 11. Each of the bearing yokes 35 through 38 pivotally engages the forward end of a bar, the several bars being designated 41 through 44, respectively.

The upper transverse bar 31 has left and right-hand brackets 46 and 47 fixed to its under side in any desired manner and lower transverse bar 32 is also provided with fixed left and right-hand brackets 48 and 49. Pivot screws or bolts 50 extend through the transverse bars 31 and 32 and through each of the brackets 46 through 49 and through each of the bars 41 through 44 associated with the respective brackets, whereby the bars 41 through 44 are mounted for pivotal movement about vertical axes which are normally fixed relative to the transverse bars 31 and 32.

With the construction so far described, it will be seen that the angle made between blade elements 10 and 11 may readily be varied by merely moving the prow element 20 forward or rearward in a longitudinal direction, the prow element carrying with it the inner adjacent ends of the blades 10 and 11 through co-operation of the pivot arms 22, 23, 25 and 26. Retention of the prow element 20 in any selected forward or rearward position automatically fixes the blade elements 10 and 11 in desired angular position. For thus adjusting and retaining the prow element in its desired longitudinal position it is provided with a pad 53 having apertures 54 and 55, see Fig. 4, in which are fixed the forward ends of rearwardly extending bars designated 57 and 58, respectively.

The bars 57 and 58 have axially sliding bearing engagement in a block 60 fixed within the angle which comprises transverse bar 32 as shown in Fig. 3. The rear ends of bars 57 and 58 are fixed to a cross plate 62 and plate 62 supports a screw 63 having collars 64 and 65 whereby the screw is rotatable in plate 62 but held against relative axial movement. Screw 63 has threaded engagement in block 60 and collar 65 thereof has a manual crank 67 fixed thereto. It will be apparent from the foregoing that rotation of screw 63 by means of crank 67 will move the bars 57 and 58, and consequently the prow element 20, forwardly and rearwardly. The threaded engagement of screw 63 in block 60 provides self-locking means for automatically retaining the prow element 20 in adjusted position.

The front face of prow element 20 comprises a portion of a surface of revolution generated about the vertical axis upon which blades 10 and 11 pivot during adjustment. By virtue of this arrangement the blades 10 and 11 will always terminate at their inner edges in tangency with the front face of the plow element as indicated schematically in Figs. 7 and 12. Fig. 12 shows the relatively small deviation from a true V even with the blades at their most acute angle of adjustment. Fig. 7 shows the blades in full lines when adjusted to extend at right angles to the longitudinal and in dot and dash lines in their most acute position of adjustment.

It will be noted that bars 41 through 44 have rear openings 70 and 71 which may be alternatively engaged with pivot screws 50. These openings are employed when it is desired to arrange the blades in a straight line obliquely for a sort of skiving action whereby material being plowed or scraped is diverted or deflected either entirely to the left or entirely to the right, depending on the setting of the blades.

Fig. 8 shows in full lines the arrangement for deflection to the left. This is achieved by engaging the right-hand pivot pins 50 with the rear openings 71 of bars 43 and 44, the left-hand bars 41 and 42 being left in the positions illustrated in Figs. 1 through 3. For deflection to the right the blades are placed in the dot and dash line position of Fig. 8 by associating the openings 70 of the left-hand bars 41 and 42 with pivot pins 50, the right-hand bars 43 and 44 being left in the positions illustrated in Figs. 1 through 3.

A pair of supporting skid elements 74 and 75 are provided, and in Figs. 1 through 3 are secured in the lower bearing yokes 37 and 38, respectively, by means of studs 76, as shown in detail in Fig. 5. The vertical disposition of skids 74 and 75 and the effective ground clearance of the blades 10 and 11 may be readily adjusted by manipulation of nuts 80 and 81 which are provided upon the studs 76.

Fig. 6 shows fragmentarily an alternative arrangement for adjusting prow element 20. In Fig. 6 bars 84 and 85 correspond to the bars 57 and 58 of Figs. 1 through 3 and rear plate 86 corresponds to the plate 62 of the former embodiment. Transverse bar 87 and bearing block 88 secured thereto correspond to the elements 32 and 60, respectively, of Figs. 1 through 3. In place of screw 63 rear plate 86 has fixed thereto a push rod 90 which is operated by a conventional piston (not shown) movable axially in a hydraulic cylinder 91, the latter having fluid control inlet and outlet passages as indicated schematically at 92 and 93, respectively, in Fig. 6. The specific means for applying and controlling hydraulic or other fluid pressure is conventional and need not be further delineated. Fluid pressure activated forward and rearward movement of bars 84 and 85 to adjust prow element 20, and accordingly blades 10 and 11, can thus be accomplished in an obvious manner.

Figs. 9 through 11 show an alternative form of the invention wherein the underlying principles are embodied in a manual plowing or scraping device. As shown in Fig. 9, the manual device may comprise left and right-hand plow or scraper blades 100 and 101. A central nose or prow element 102 is provided as in the previous embodiment, although as shown in Fig. 9 this element may be of sheet metal and has a semicircular band 103, whose ends are welded or otherwise secured to the rear face of the prow element. The blade 100 has fixed thereto pivot arms 105 and 106 corresponding to the pivot arms of the first-described embodiment and the blade 101 has similar pivot arms 107 and 108. The several pivoted arms are pivotally attached to the upper and lower sides of band 103 as shown in Fig. 9.

As in the previous embodiment, the substantially vertical axis extending through the pivotal connections of arms 105 and 108 with band 103 comprises an axis of generation for the surface of revolution which defines the front face of prow element 102.

The relative positions of pivotal adjustment of the blades 100 and 101 are maintained by means of tie rods 110 and 111, respectively. The forward ends of tie rods 110 and 111 may engage loops 112 and 113 fixed to the rear sides of blades 100 and 101, respectively, whereby the tie rods have limited universally swivelling movement relative to the blades. The rear ends of tie rods 110 and 111 may be provided with eye formations and a nut and bolt connection 115 may be disposed in any one of a series of transverse openings 116 formed in a handle member 117. As shown in Fig. 10, the bolt and nut assembly 115 connects both tie rods jointly so that the blades 100 and 101 are in similar positions of adjustment. However, separate bolt and nut connections may be employed to associate the eyes of each of the tie rods 110 and 111 with different openings 116, if desired.

Handle 117 may be mounted by threaded connection, as at 118, with a threaded projection of a stem element 119. One end of stem element 119 has pivotal connection with a pair of ears fixed to the rear face of prow element 102 as at 120, and the threaded opposite end of stem element 119 passes through an arcuate slot 122 formed along band element 103. Stem element 119 has an enlarged flange 124 which engages against the inner face of band 103 and a nut element 125 engaging the threads of stem 119 may be tightened to clamp the band 103 between flange 124 and nut 125 to fix the handle element in any desired position of adjustment along slot 122. This permits the angle of inclination of handle 117 to be adjusted with respect to a given disposition of the blades 100 and 101 and the prow element 102. Such adjustment is desirable to suit the device to users of varying height and also to change the effective angle that the plowing and scraping elements make with the vertical, as viewed from the side.

As in the embodiment first described, the blades 100 and 101 of the present form of the invention maintain tangency with the prow element 102 from top to bottom regardless of the position of angular adjustment which the blades occupy with respect to each other.

What is claimed is:

1. Material moving apparatus comprising a pair of generally upright blade elements and a central prow element, said blade elements being pivotally connected to said prow element for angular adjustment about a substantially central upright axis, a propelling element, link means pivotally connected to said blade elements at opposite sides of said prow element and extending rearwardly to pivotal engagement with said propelling element, and means engaging between said propelling element and said prow element and operable to move said prow element relatively forwardly and rearwardly and thus adjust the angle between the blade elements.

2. Material moving apparatus comprising a pair of generally upright blade elements and a central prow element, said blade elements being pivotally connected to said prow element for angular adjustment about a substantially central upright axis, a propelling element, means connected to said blade elements at opposite sides of said prow element and extending rearwardly for engagement with said propelling element, and means engaging between said propelling element and said prow element and operable to move said prow element relatively forwardly and rearwardly and thus adjust the angle between the blade elements.

3. Material moving apparatus comprising a pair of generally upright blade elements and a central prow element, said blade elements being pivotally connected to said prow element for angular adjustment about a substantially central upright axis, a propelling element, a link element pivotally connected to each blade element laterally of said prow element and extending rearwardly to pivotal engagement with said propelling element, and means engaging between said propelling element and said prow element and operable to move said prow element relatively forwardly and rearwardly and thus adjust the angle between the blade elements, the rear pivotal engagement of said link elements with said propelling element being independently adjustable lengthwise of said link elements to dispose said blade elements selectively in symmetrical or unsymmetrical relative positions.

4. Material moving apparatus comprising a central prow element, a pair of blade elements projecting laterally therefrom and mounted for pivotal adjustment about a common upright central axis, said prow element having a forward face comprising a surface of revolution generated about said central axis and following the contour of the inner edges of said blades whereby a substantially continuous plowing surface is presented regardless of the position of pivotal adjustment of said blades.

5. Material moving apparatus comprising a central prow element, a pair of blade elements projecting laterally therefrom and mounted for pivotal adjustment about a common upright central axis, the forward faces of said blade elements being convex in vertical cross-section, said prow element having a forward face comprising a surface of revolution generated about said central axis and following the convex contour of the inner edges of said blades whereby a substantially continuous plowing surface is presented regardless of the position of pivotal adjustment of said blades.

6. Material moving apparatus comprising a central prow element, a pair of blade elements projecting laterally therefrom and mounted for pivotal adjustment about a common upright central axis, said prow element having a forward face comprising a surface of revolution generated about said central axis and following the contour of the inner edges of said blades and said inner edges being substantially tangent to said forward face whereby a substantially continuous plowing surface is presented regardless of the position of pivotal adjustment of said blades.

7. Material moving apparatus comprising a central prow element, a pair of blade elements projecting laterally therefrom and mounted for pivotal adjustment about a common upright central axis, the forward faces of said blade element being convex in vertical cross-section, said prow element having a forward face comprising a surface of revolution generated about said central axis and following the convex contour of the inner edges of said blades and said inner edges being substantially tangent to said forward face whereby a substantially continuous plowing surface is presented regardless of the position of pivotal adjustment of said blades.

8. Material moving apparatus comprising a pair of generally upright blade elements and a central prow element, said blade elements being pivotally connected to said prow element for angular adjustment about a substantially central upright axis, a propelling element, means connected to said blade elements at opposite sides of said prow element and extending rearwardly to engagement with said propelling element, and self-locking screw means engaging between said propelling element and said prow element and operable to move said prow element relatively forwardly and rearwardly and thus adjust the angle between the blade elements.

9. Material moving apparatus comprising a pair of generally upright blade elements and a central prow element, said blade elements being pivotally connected to said prow element for angular adjustment about a substantially central upright axis, a propelling element, means connected to said blade elements at opposite sides of said prow element and extending rearwardly to engagement with said propelling element, and fluid motor means engaging between said propelling element and said prow element and operable to move said prow element relatively forwardly and rearwardly and thus adjust the angle between the blade elements.

10. Material moving apparatus comprising a pair of generally upright blade elements and a central prow element, said blade elements being pivotally connected to said prow element for angular adjustment about a substantially central upright axis, a manual propelling handle extending rearwardly from said prow element, link means connected to said blade elements at opposite sides of said prow element and extending rearwardly to engagement with said handle, said link means being adapted to be secured to said handle at various positions therealong whereby to move said prow element relatively forwardly and rearwardly and thus adjust the angle between the blade elements.

11. Material moving apparatus comprising a pair of generally upright blade elements and a central prow element, said blade elements being pivotally connected to said prow element for angular adjustment about a substantially central upright axis, a manual propelling handle extending rearwardly from said prow element, link means connected to said blade elements at opposite sides of said prow element and extending rearwardly to engagement with said handle, and means engaging between said prow element and said handle for adjusting the angle of the handle relative to the prow element about a transverse horizontal axis.

12. In a snow plow, a central member having an arcuate face portion, a pair of wings extending laterally from and in tangential relation to said face portion, means securing said wings to said member for pivotal movement about the axis of the arcuate face portion, whereby during relative movement between said member and said wings the tangential relation of the wings and the member is maintained, and means for effecting relative movement between the wings and the central member.

13. In a snow plow a central member having an arcuate face portion, a pair of wings extending laterally from and in tangential relation to said face portion, means swingably securing the inner edge portion of the wings to the axis of the arcuate face portion whereby the tangential relation of the wing to the member during relative movement therebetween is maintained, brace means pivotally secured to the outer portion of the wings to permit movement of the blades, and means connected to the central member and operable to effect a relative movement between the wings, the central member and the braces, whereby the wings may be angularly disposed to each other to provide a substantially V-shaped plow.

WALTER UEBELHOER.

REFERENCES CITED

The following references are of record in the file of this patent:

UNITED STATES PATENTS

| Number | Name | Date |
|---|---|---|
| 355,519 | Fay | Jan. 4, 1887 |
| 469,682 | Denham | Mar. 1, 1892 |
| 1,333,158 | Campbell | Mar. 9, 1920 |
| 1,453,811 | Starkweather | May 1, 1923 |
| 1,889,667 | Klauer | Nov. 29, 1932 |